United States Patent
Yamamoto et al.

(10) Patent No.: US 12,107,513 B2
(45) Date of Patent: Oct. 1, 2024

(54) THREE-LEVEL POWER CONVERTER AND METHOD OF CONTROLLING INTERMEDIATE POTENTIAL OF DIRECT CURRENT POWER SUPPLY UNIT

(71) Applicant: Mitsubishi Electric Corporation, Tokyo (JP)

(72) Inventors: Takeo Yamamoto, Tokyo (JP); Shinichiro Hayashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 215 days.

(21) Appl. No.: 17/801,599

(22) PCT Filed: Mar. 27, 2020

(86) PCT No.: PCT/JP2020/014258
§ 371 (c)(1),
(2) Date: Aug. 23, 2022

(87) PCT Pub. No.: WO2021/192288
PCT Pub. Date: Sep. 30, 2021

(65) Prior Publication Data
US 2023/0137557 A1    May 4, 2023

(51) Int. Cl.
*H02M 7/483* (2007.01)
*H02M 1/14* (2006.01)
(Continued)

(52) U.S. Cl.
CPC ........... *H02M 7/483* (2013.01); *H02M 1/143* (2013.01); *H02M 7/4833* (2021.05); *H02M 7/487* (2013.01); *H02M 7/53873* (2013.01)

(58) Field of Classification Search
CPC .... H02M 7/483; H02M 1/143; H02M 7/4833; H02M 7/487; H02M 7/53873;
(Continued)

(56) References Cited

U.S. PATENT DOCUMENTS 5,614,803 A * 3/1997 Morioka ................. H02P 23/08
318/590
6,842,354 B1 * 1/2005 Tallam .................. H02M 7/483
363/132

(Continued)

FOREIGN PATENT DOCUMENTS

| JP | 2014082839 A | 5/2014 |
| JP | 2016042772 A | 3/2016 |
| WO | 0165675 A1 | 9/2001 |

OTHER PUBLICATIONS

International Search Report (PCT/ISA/210) with translation and Written Opinion (PCT/ISA/237) mailed on Jul. 7, 2020, by the Japan Patent Office as the International Searching Authority for International Application No. PCT/JP2020/014258. (8 pages).

(Continued)

*Primary Examiner* — Yusef A Ahmed
(74) *Attorney, Agent, or Firm* — BUCHANAN INGERSOLL & ROONEY PC (57) ABSTRACT

A three-level power converter includes a direct current power supply unit including a filter capacitor connected between a high potential line and an intermediate potential line and a filter capacitor connected between the intermediate potential line and a low potential line, and a power conversion circuit that converts a three-level direct current voltage output from the high potential line, the intermediate potential line, and the low potential line into a three-phase alternating current voltage. A controller generates an imbalance signal representing an imbalance between a first capacitor voltage and a second capacitor voltage on the basis of values detected by voltage sensors, and generates a modulation signal for causing the power conversion circuit to perform a two-phase modulation operation on the basis of a superimposed signal obtained by superimposing the imbal- (Continued)

ance signal on a reference signal of the three-phase alternating current voltage.

19 Claims, 8 Drawing Sheets

(51) Int. Cl.
    *H02M 7/487*     (2007.01)
    *H02M 7/5387*     (2007.01)

(58) Field of Classification Search
    CPC ............ H02M 7/5395; H02M 1/0064; H02M 1/0025; H02M 7/538; Y02E 40/50
    See application file for complete search history.

(56) References Cited

U.S. PATENT DOCUMENTS

| | | | | |
|---|---|---|---|---|
| 9,654,026 B2* | 5/2017 | Nakashima | ............ | H02M 7/537 |
| 2001/0015904 A1* | 8/2001 | Kimura | ................ | H02M 7/538 |
| | | | | 363/131 |
| 2003/0137857 A1* | 7/2003 | Yamanaka | ........ | H02M 7/53873 |
| | | | | 363/132 |
| 2006/0215429 A1* | 9/2006 | Oka | ........................ | H02P 21/22 |
| | | | | 363/97 |
| 2008/0106919 A1* | 5/2008 | Shin | ........................ | H02M 7/48 |
| | | | | 363/131 |
| 2008/0265809 A1* | 10/2008 | Oi | .......................... | H02P 21/06 |
| | | | | 318/722 |
| 2008/0304301 A1* | 12/2008 | Nishio | .................. | H02M 7/487 |
| | | | | 363/132 |
| 2009/0167224 A1* | 7/2009 | Miura | ..................... | H02P 6/10 |
| | | | | 318/400.23 |
| 2010/0060211 A1* | 3/2010 | Hashimoto | ............. | H02P 21/22 |
| | | | | 318/400.02 |
| 2010/0259207 A1* | 10/2010 | Kitanaka | ................ | H02P 21/22 |
| | | | | 318/400.17 |
| 2011/0085361 A1* | 4/2011 | Sakakibara | ......... | H02M 7/2176 |
| | | | | 363/126 |
| 2011/0133678 A1* | 6/2011 | Tomigashi | .............. | H02P 27/08 |
| | | | | 318/400.04 |
| 2011/0134672 A1* | 6/2011 | Sato | ........................ | H02M 1/10 |
| | | | | 363/126 |
| 2011/0187308 A1* | 8/2011 | Suhama | ................... | H02P 21/00 |
| | | | | 318/798 |
| 2011/0241587 A1* | 10/2011 | Naruse | .................... | H02M 1/14 |
| | | | | 318/400.27 |
| 2011/0273125 A1* | 11/2011 | Yamada | ................ | H02P 27/085 |
| | | | | 318/503 |
| 2012/0002454 A1* | 1/2012 | Kuboyama | ........... | H02M 7/487 |
| | | | | 363/132 |
| 2012/0155135 A1* | 6/2012 | Fujii | ..................... | H02M 7/487 |
| | | | | 363/98 |
| 2012/0206075 A1* | 8/2012 | Kimpara | ................. | H02P 21/50 |
| | | | | 318/400.15 |
| 2013/0180273 A1* | 7/2013 | Hatakeyama | ........... | F04B 35/04 |
| | | | | 62/115 |
| 2013/0229843 A1* | 9/2013 | Takatsuka | ................ | H02M 1/44 |
| | | | | 363/97 |
| 2013/0264974 A1* | 10/2013 | Suzuki | .................... | H02P 27/08 |
| | | | | 318/139 |
| 2013/0291578 A1* | 11/2013 | Hatakeyama | ........... | H02P 29/62 |
| | | | | 417/45 |
| 2015/0016155 A1* | 1/2015 | Lee | ......................... | H02M 1/12 |
| | | | | 363/44 |
| 2015/0054432 A1* | 2/2015 | Omata | .................... | H02P 21/14 |
| | | | | 318/400.21 |
| 2015/0236609 A1* | 8/2015 | Kato | ....................... | H02M 7/06 |
| | | | | 363/78 |
| 2015/0280601 A1 | 10/2015 | Sakakibara | | |
| 2016/0072406 A1* | 3/2016 | Sato | ....................... | H02M 7/537 |
| | | | | 363/131 |
| 2016/0094180 A1* | 3/2016 | Ajima | .................... | B62D 5/065 |
| | | | | 318/504 |
| 2016/0190971 A1* | 6/2016 | Yamakawa | ............. | H02P 27/08 |
| | | | | 318/504 |
| 2016/0211749 A1* | 7/2016 | Okada | .................... | H02M 3/158 |
| 2016/0226408 A1* | 8/2016 | Yamakawa | ............. | H02P 6/10 |
| 2017/0366101 A1* | 12/2017 | Suzuki | .................... | H02P 6/16 |
| 2019/0097559 A1* | 3/2019 | Li | ..................... | H02M 7/53871 |
| 2019/0367080 A1* | 12/2019 | Yamanaka | ............. | B62D 5/046 |
| 2019/0375449 A1* | 12/2019 | Takase | .................... | H02P 21/06 |
| 2019/0393824 A1* | 12/2019 | Osugi | ................. | H02P 21/0003 |
| 2020/0119678 A1* | 4/2020 | Hoshino | ................. | H02P 27/08 |
| 2020/0153375 A1* | 5/2020 | Mori | ................. | H02M 7/53871 |
| 2020/0212822 A1* | 7/2020 | Ogura | .................... | H02M 7/539 |
| 2020/0373854 A1* | 11/2020 | Tanaka | .................... | H02M 1/12 |
| 2020/0382021 A1* | 12/2020 | Yamane | .................. | H02M 27/06 |
| 2021/0036632 A1* | 2/2021 | Hayashi | ................. | H02M 3/157 |
| 2021/0044243 A1* | 2/2021 | Hara | .................... | H02P 27/085 |
| 2021/0175742 A1* | 6/2021 | Hayashi | ............... | H02M 7/4833 |
| 2021/0359634 A1* | 11/2021 | Tsuchiya | ............. | H02M 7/5395 |
| 2021/0367545 A1* | 11/2021 | Ogami | ..................... | H02P 27/08 |
| 2022/0263448 A1* | 8/2022 | Yamane | ................. | H02P 27/08 |
| 2022/0321037 A1* | 10/2022 | Onuki | ................. | H02M 7/5395 |
| 2023/0318488 A1* | 10/2023 | Mori | .................... | H02M 7/5395 |
| | | | | 363/41 |
| 2023/0318489 A1* | 10/2023 | Uemura | ................. | H02M 5/458 |
| | | | | 363/40 |

OTHER PUBLICATIONS

Office Action issued in corresponding Indian Patent Application No. 202227051853, mailed on Dec. 29, 2022, 5 pages.

Hearing Notice dated Jun. 12, 2024, issued in the corresponding Indian Patent Application No. 202227051853, 2 pages.

* cited by examiner

THREE-LEVEL POWER CONVERTER AND METHOD OF CONTROLLING INTERMEDIATE POTENTIAL OF DIRECT CURRENT POWER SUPPLY UNIT

FIELD

The present disclosure relates to a three-level power converter and a method of controlling an intermediate potential of a direct current power supply unit included in the three-level power converter, the three-level power converter converting a three-level direct current voltage into a three-phase alternating current voltage or converting a single-phase or three-phase alternating current voltage into a three-level direct current voltage and outputting the three-phase alternating current voltage or three-level direct current voltage.

BACKGROUND

Patent Literature 1 below discloses a technique for reducing the number of switching operations by applying a two-phase modulation method to the control of a switching element in a method of controlling a three-level inverter that converts a three-level direct current voltage into a three-phase alternating current voltage.

CITATION LIST

Patent Literature

Patent Literature 1: Japanese Patent Application Laid-open No. 2016-42772

SUMMARY

Technical Problem

In a three-level power converter such as the three-level inverter or a three-level converter, a direct current power supply unit included in the three-level power converter has a configuration in which two capacitors are connected in series in order to obtain an intermediate potential. In the three-level inverter, two capacitor voltages need to be equally divided in order to make an output waveform a clear sine wave.

In a case of a three-phase modulation method, when the two capacitor voltages are not equally divided to result in an imbalance, the voltage imbalance generated between the two capacitors can be eliminated by superimposing a direct current offset voltage corresponding to the imbalance on a voltage command of the three-level inverter. On the other hand, in a case of the two-phase modulation method, switching controls of a U phase, a V phase, and a W phase are stopped in turn at every fixed interval of 60° so that an output line voltage is controlled by the remaining two phases. Therefore, even if the direct current offset voltage is superimposed on the voltage command of the inverter, the voltage imbalance between the two capacitors cannot be eliminated.

The present disclosure has been made in view of the above, and an object of the present disclosure is to provide a three-level power converter capable of eliminating a voltage imbalance between two capacitors even when the three-level power converter adopts a two-phase modulation method.

Solution to Problem

In order to solve the above problem and achieve the object, a three-level power converter according to the present disclosure includes a direct current power supply unit, a power conversion circuit, a controller, a first sensor, and a second sensor. The direct current power supply unit includes a first capacitor connected between a high potential line and an intermediate potential line, and a second capacitor connected between the intermediate potential line and a low potential line. The power conversion circuit converts a three-level direct current voltage output from the high potential line, the intermediate potential line, and the low potential line into a three-phase alternating current voltage. Alternatively, the power conversion circuit converts a single-phase alternating current voltage or a three-phase alternating current voltage into a three-level direct current voltage and outputs the three-level direct current voltage to the high potential line, the intermediate potential line, and the low potential line. The controller controls an operation of the power conversion circuit. The first sensor and the second sensor detect a first physical quantity that is a physical quantity of the first capacitor and a second physical quantity that is a physical quantity of the second capacitor. The controller includes a first signal generator, a superimposition unit, and a second signal generator. The first signal generator generates an imbalance signal representing an imbalance between the first physical quantity and the second physical quantity on the basis of values detected by the first sensor and the second sensor. The superimposition unit superimposes the imbalance signal on a reference signal of the three-phase alternating current voltage. The second signal generator generates a modulation signal that causes the power conversion circuit to perform a two-phase modulation operation on the basis of a superimposed signal output from the superimposition unit.

Advantageous Effects of Invention

The present disclosure has an effect that the voltage imbalance between the two capacitors can be eliminated even when the three-level power converter adopts the two-phase modulation method.

DESCRIPTION OF EMBODIMENTS

Hereinafter, a three-level power converter and a method of controlling an intermediate potential of a direct current power supply unit according to embodiments of the present disclosure will be described in detail with reference to the drawings. Note that in the following embodiments, an auxiliary power supply device for a railway vehicle will be described as an example, which however is not intended to exclude application to other uses. Also, in the following description, electrical connection and physical connection are not distinguished from each other and are simply referred to as "connection".

First Embodiment

Figure 1:
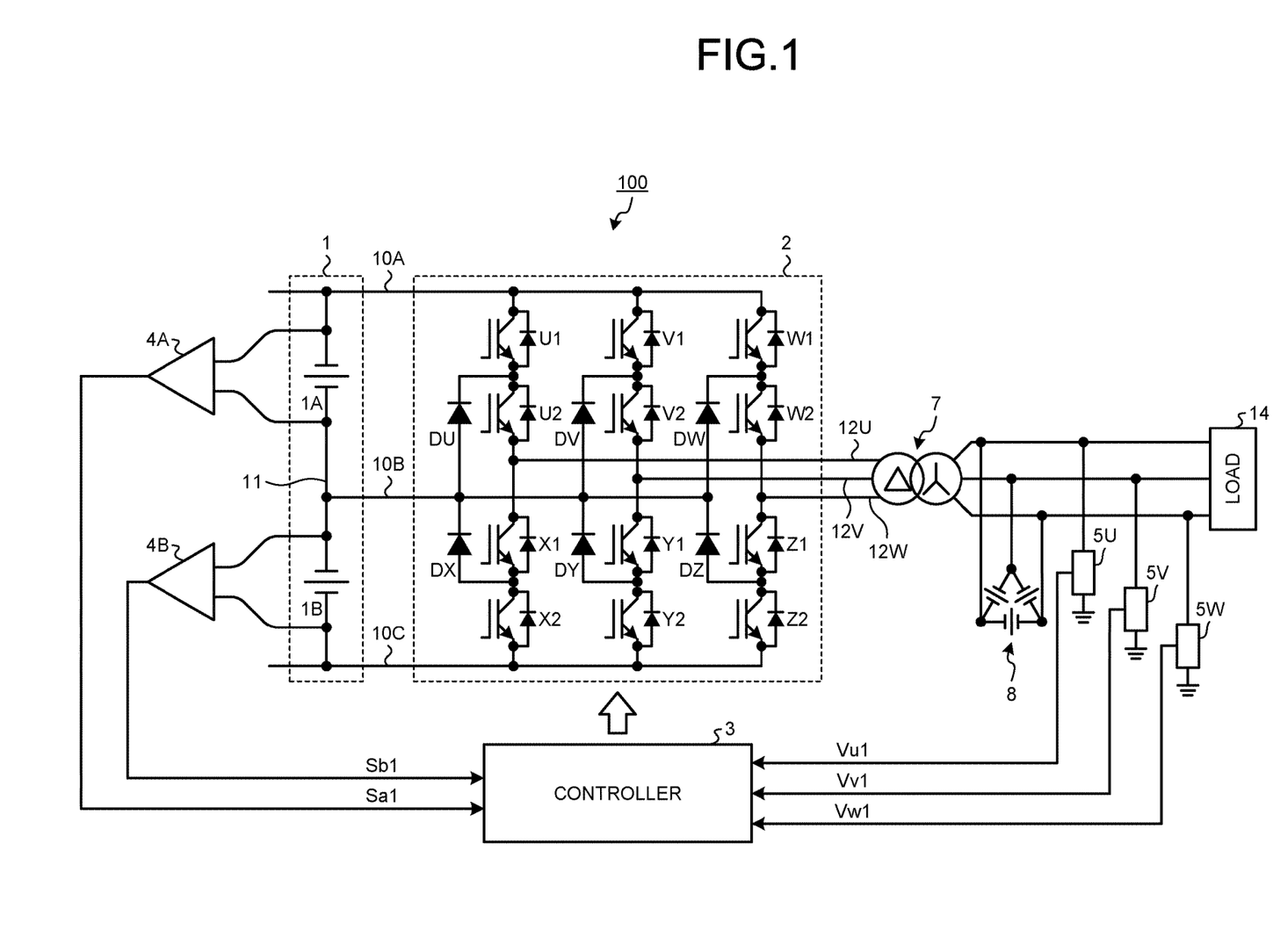
FIG. 1 is a diagram illustrating an example of a configuration of a three-level power converter according to a first embodiment.

FIG. 1 is a diagram illustrating an example of a configuration of a three-level power converter 100 according to a first embodiment. As illustrated in FIG. 1, the three-level power converter 100 according to the first embodiment includes a direct current power supply unit 1, a power conversion circuit 2, a controller 3, and voltage sensors 4A and 4B. FIG. 1 illustrates a configuration in which the three-level power converter 100 is applied to an auxiliary power supply device for a railway vehicle.

The three-level power converter 100 operates as a three-level inverter. At an output terminal of the three-level power converter 100, a transformer 7 is connected. The transformer 7 is connected to the three-level power converter 100 on a primary side thereof and connected to a load 14 on a secondary side thereof. Also, in order to make an output waveform on the secondary side of the transformer 7 a sine wave, a delta-connected three-phase capacitor circuit 8 is connected to the secondary side of the transformer 7. Examples of the load 14 include a vehicle interior lighting device, a door opening and closing device, an air conditioner, a safety device, a compressor, a battery, and a control power supply.

The direct current power supply unit 1 includes a filter capacitor 1A as a first capacitor and a filter capacitor 1B as a second capacitor. The filter capacitor 1A and the filter capacitor 1B are connected in series.

One end of the filter capacitor 1A is connected to a high potential line 10A, and another end of the filter capacitor 1A is connected to an intermediate potential line 10B. One end of the filter capacitor 1B is connected to the intermediate potential line 10B, and another end of the filter capacitor 1B is connected to a low potential line 10C. A connection point 11 at which the other end of the filter capacitor 1A and the one end of the filter capacitor 1B are connected is also called a "midpoint" or a "neutral point".

The power conversion circuit 2 includes positive arms including switching elements U1, U2, V1, V2, W1, and W2 and negative arms including switching elements X1, X2, Y1, Y2, Z1, and Z2. The switching elements U1, U2, X1, and X2 are connected in series in this order to form a U-phase leg. The switching elements V1, V2, Y1, and Y2 are connected in series in this order to form a V-phase leg. The switching elements W1, W2, Z1, and Z2 are connected in series in this order to form a W-phase leg. The U-phase, V-phase, and W-phase legs are connected in parallel to one another to form a three-phase bridge circuit.

In a U-phase positive arm, the switching elements U1 and U2 are connected in series in this order. One end of the switching element U1 is connected to the high potential line 10A, and one end of the switching element U2 is connected to a U-phase alternating current wire 12U. A connection point between another end of the switching element U1 and another end of the switching element U2 is connected to a cathode of a diode DU. An anode of the diode DU is connected to the intermediate potential line 10B.

In a U-phase negative arm, the switching elements X1 and X2 are connected in series in this order. One end of the switching element X1 is connected to the U-phase alternating current wire 12U, and one end of the switching element X2 is connected to the low potential line 10C. A connection point between another end of the switching element X1 and another end of the switching element X2 is connected to an anode of a diode DX. A cathode of the diode DX is connected to the intermediate potential line 10B.

In a V-phase positive arm, the switching elements V1 and V2 are connected in series in this order. One end of the switching element V1 is connected to the high potential line 10A, and one end of the switching element V2 is connected to a V-phase alternating current wire 12V. A connection point between another end of the switching element V1 and another end of the switching element V2 is connected to a cathode of a diode DV. An anode of the diode DV is connected to the intermediate potential line 10B.

In a V-phase negative arm, the switching elements Y1 and Y2 are connected in series in this order. One end of the switching element Y1 is connected to the V-phase alternating current wire 12V, and one end of the switching element Y2 is connected to the low potential line 10C. A connection point between another end of the switching element Y1 and another end of the switching element Y2 is connected to an anode of a diode DY. A cathode of the diode DY is connected to the intermediate potential line 10B.

In a W-phase positive arm, the switching elements W1 and W2 are connected in series in this order. One end of the switching element W1 is connected to the high potential line 10A, and one end of the switching element W2 is connected to a W-phase alternating current wire 12W. A connection point between another end of the switching element W1 and another end of the switching element W2 is connected to a cathode of a diode DW. An anode of the diode DW is connected to the intermediate potential line 10B.

In a W-phase negative arm, the switching elements Z1 and Z2 are connected in series in this order. One end of the switching element Z1 is connected to the W-phase alternating current wire 12W, and one end of the switching element Z2 is connected to the low potential line 10C. A connection point between another end of the switching element Z1 and another end of the switching element Z2 is connected to an anode of a diode DZ. A cathode of the diode DZ is connected to the intermediate potential line 10B.

With the above configuration, the direct current power supply unit 1 applies a three-level direct current voltage to the power conversion circuit 2 through the high potential line 10A, the intermediate potential line 10B, and the low potential line 10C. The power conversion circuit 2 brings the switching elements U1, U2, V1, V2, W1, W2, X1, X2, Y1, Y2, Z1, and Z2 into conduction, converts the three-level direct current voltage into a three-phase alternating current voltage, and outputs the three-phase alternating current voltage.

The voltage of each phase applied to the load 14 is detected by a corresponding one of voltage detectors 5U, 5V, and 5W. A U-phase output voltage Vu1, a V-phase output voltage Vv1, and a W-phase output voltage Vw1 detected by corresponding ones of the voltage detectors 5U, 5V, and 5W are input to the controller 3. The controller 3 performs pulse width modulation (PWM) control on the switching elements U1, U2, V1, V2, W1, W2, X1, X2, Y1, Y2, Z1, and Z2 on the basis of the U-phase output voltage Vu1, the V-phase output voltage Vv1, and the W-phase output voltage Vw1. As a result, the direct current voltage smoothed by the filter capacitors 1A and 1B is converted into the three-phase alternating current voltage having a desired voltage value and a desired frequency.

Moreover, in the first embodiment, the controller 3 performs the PWM control on the switching elements U1, U2, V1, V2, W1, W2, X1, X2, Y1, Y2, Z1, and Z2 by adopting a two-phase modulation method. As a result, the number of switching operations is reduced compared to a case where the two-phase modulation method is not adopted, whereby the three-level power converter 100 has a reduced switching loss and improved efficiency. Note that the first embodiment uses a known technique for the two-phase modulation, and detailed description thereof will be omitted here.

An example of the switching elements U1, U2, V1, V2, W1, W2, X1, X2, Y1, Y2, Z1, and 22 is an insulated gate bipolar transistor (IGBT) with a built-in anti-parallel diode as illustrated in the drawing, but another switching element may be used. Another example of the switching elements U1, U2, V1, V2, W1, W2, X1, X2, Y1, Y2, Z1, and Z2 is a metal oxide semiconductor field effect transistor (MOSFET). Moreover, the material used to make the switching element may be not just silicon (Si) but may be silicon carbide (SiC), gallium nitride (GaN), gallium oxide ($Ga_2O_3$), diamond, or the like that is a wide band gap semiconductor. The switching element formed using the wide band gap semiconductor material can achieve reduced loss and faster switching.

The first embodiment further performs control for eliminating a voltage imbalance between the filter capacitors 1A and 1B. In order to perform this control, the three-level power converter 100 is provided with the voltage sensors 4A and 4B. The voltage sensor 4A detects a voltage across the filter capacitor 1A. The voltage sensor 4B detects a voltage across the filter capacitor 1B. Hereinafter, the voltage across the filter capacitor 1A detected by the voltage sensor 4A is referred to as a "first capacitor voltage", and the voltage across the filter capacitor 1B detected by the voltage sensor 4B is referred to as a "second capacitor voltage". A first capacitor voltage Sa1 detected by the voltage sensor 4A and a second capacitor voltage Sb1 detected by the voltage sensor 4B are input to the controller 3. The controller 3 performs control to eliminate the voltage imbalance between the filter capacitors 1A and 1B on the basis of the first capacitor voltage Sa1 and the second capacitor voltage Sb1. Details of the control will be described later.

The first capacitor voltage is a physical quantity representing a state of the filter capacitor 1A. Therefore, in the following description, the first capacitor voltage may be referred to as a "first physical quantity". Similarly, the second capacitor voltage is a physical quantity representing a state of the filter capacitor 1B. Therefore, in the following description, the second capacitor voltage may be referred to as a "second physical quantity".

Figure 9:
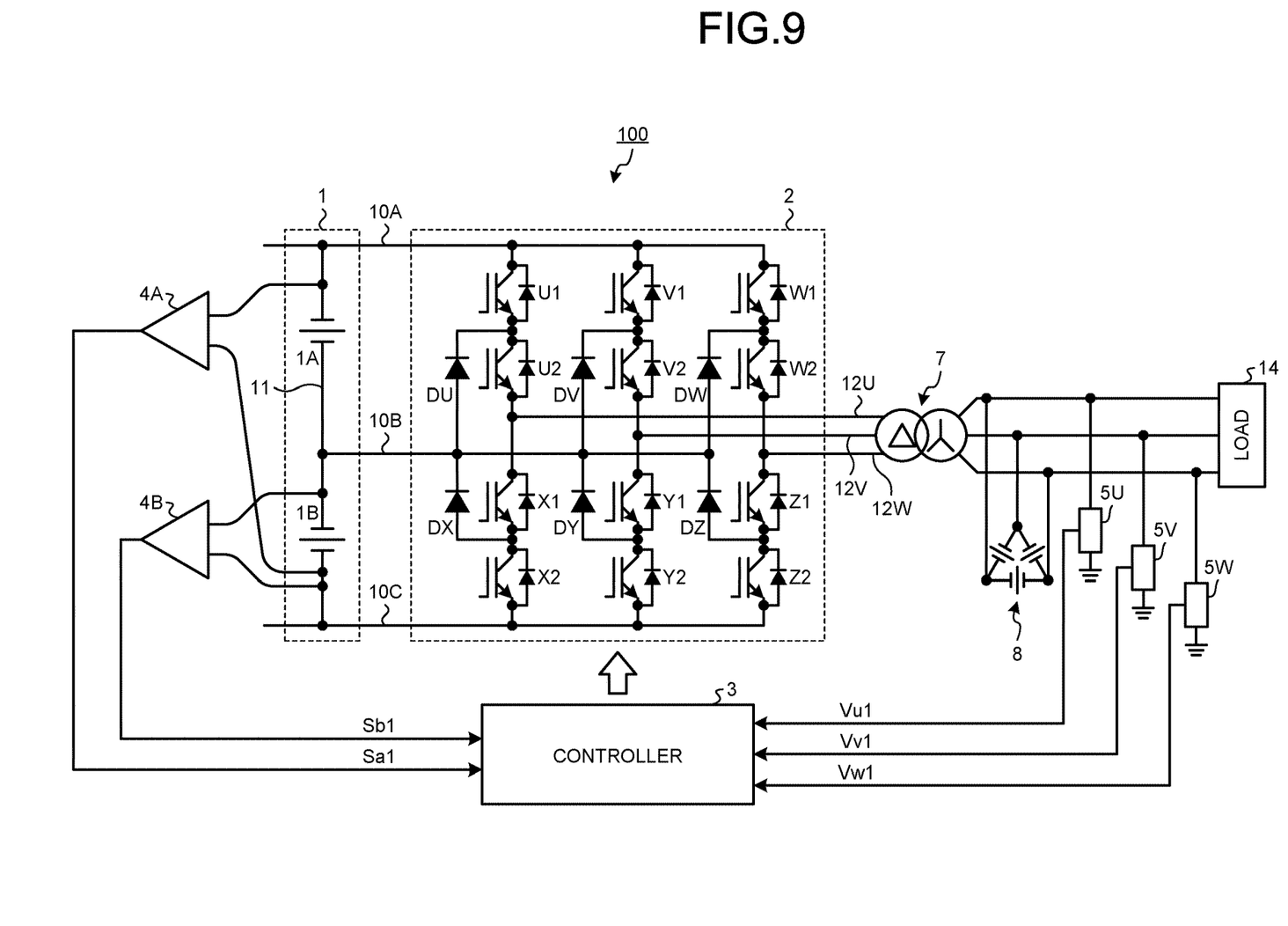
FIG. 9 is a diagram illustrating an example of the configuration of the three-level power converter according to a modification of the first embodiment.

Note that although FIG. 1 illustrates an example in which the voltage sensor 4A detects the voltage across the filter capacitor 1A and the voltage sensor 4B detects the voltage across the filter capacitor 1B, the present disclosure is not limited to this example. The configuration in FIG. 1 may be replaced by a configuration in FIG. 9. FIG. 9 is a diagram illustrating an example of the configuration of the three-level power converter 100 according to a modification of the first embodiment.

In FIG. 9, a modification is made such that the voltage sensor 4A detects a total voltage as the voltage across the filter capacitors 1A and 1B. In the case of this configuration, the first capacitor voltage Sa1 detected by the voltage sensor 4A is input to the controller 3 as a detected value including information on the total voltage of the filter capacitors 1A and 1B. The controller 3 can calculate the voltage across the filter capacitor 1A on the basis of the detected value of the total voltage of the filter capacitors 1A and 1B and a detected value of the voltage across the filter capacitor 1B detected by the voltage sensor 4B.

Note that although not illustrated, a configuration may be adopted in which the voltage sensor 4A detects the voltage across the filter capacitor 1A and the voltage sensor 4B detects the total voltage that is the voltage across the filter capacitors 1A and 1B. This configuration can also obtain the voltage across the filter capacitor 1A and the voltage across the filter capacitor 1B. That is, the voltage sensors 4A and 4B in this configuration and the configurations illustrated in FIGS. 1 and 9 both operate as a first sensor and a second sensor that detect the first physical quantity as the physical quantity of the first capacitor and the second physical quantity as the physical quantity of the second capacitor.

Figure 2:
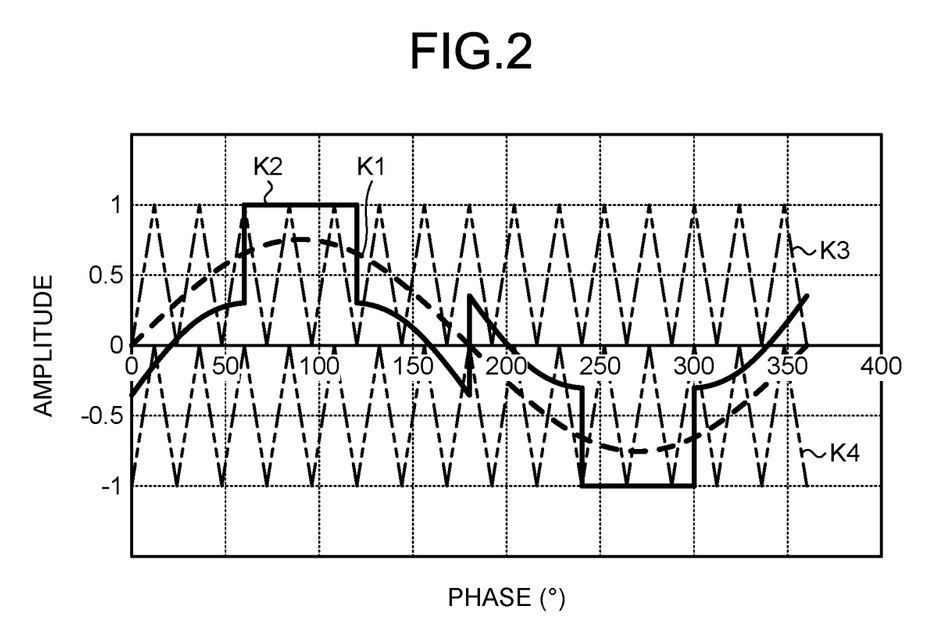
FIG. 2 is a first graph used for explaining a principle of a control method of the first embodiment.
Figure 3:
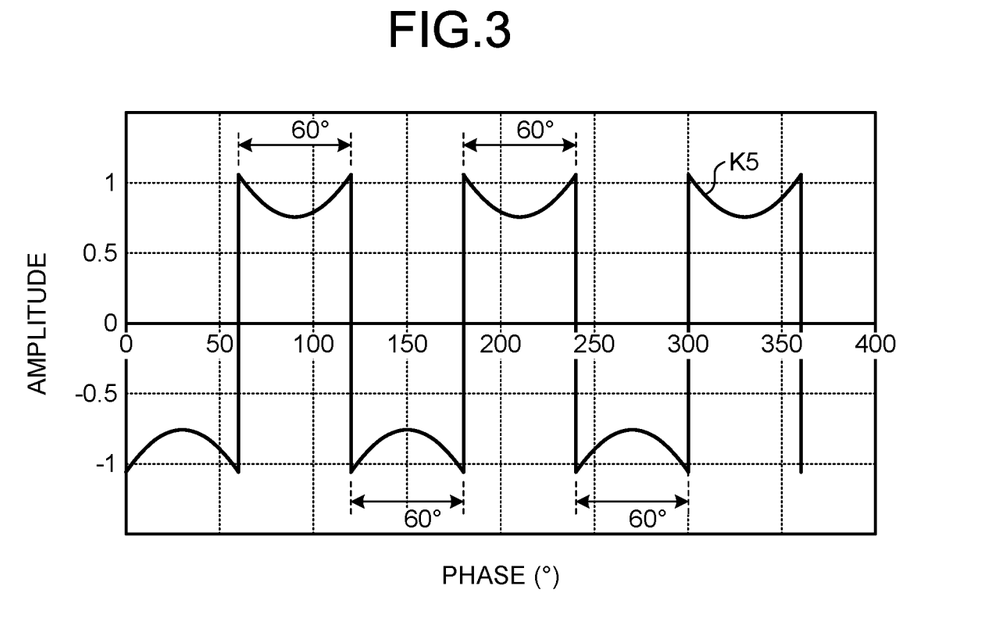
FIG. 3 is a second graph used for explaining the principle of the control method of the first embodiment.
Figure 4:
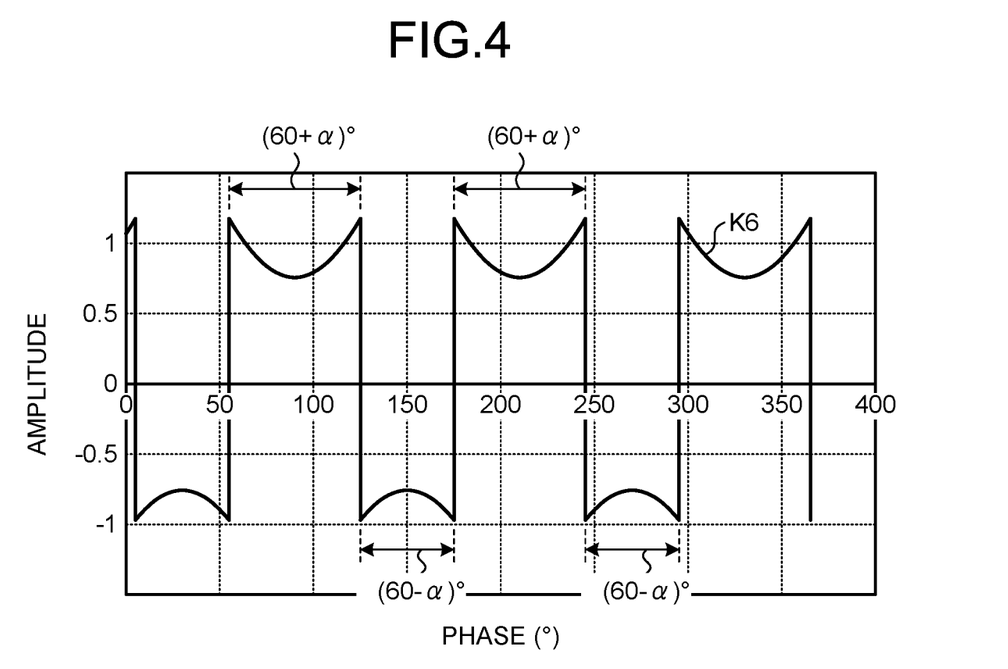
FIG. 4 is a third graph used for explaining the principle of the control method of the first embodiment.

Next, a principle of a control method of the first embodiment for eliminating the voltage imbalance in the three-level power converter 100 will be described with reference to FIGS. 2 to 4. FIG. 2 is a first graph used for explaining the principle of the control method of the first embodiment. FIG. 2 illustrates an example of a waveform of a voltage command in typical two-phase modulation. FIG. 3 is a second graph used for explaining the principle of the control method of the first embodiment. FIG. 3 illustrates an example of a waveform of a zero-sequence voltage in a case where the voltage is balanced between the filter capacitors 1A and 1B. FIG. 4 is a third graph used for explaining the principle of the control method of the first embodiment. FIG. 4 illustrates an example of the waveform of the zero-sequence voltage at the time of control in a case where the voltage is unbalanced between the filter capacitors 1A and 1B. In each of FIGS. 2 to 4, a horizontal axis represents a phase, and a vertical axis represents a normalized amplitude. Note that the zero-sequence voltage is a voltage at a neutral point of the load 14 as viewed from a ground point. This zero-sequence voltage can be equivalently obtained by adding the output voltages of the phases applied to the load 14, that is, the three voltages being the U-phase output voltage, the V-phase output voltage, and the W-phase output voltage.

In FIG. 2, a waveform K1 indicated by a thick broken line indicates a voltage command value for one phase among three-phase voltage command values, and is in this case assumed to be a U-phase voltage command value. A waveform K2 indicated by a thick solid line is the U-phase voltage command value for two-phase modulation generated using the U-phase voltage command value indicated by the waveform K1. A waveform K3 is a carrier wave used in generating a control signal for controlling the switching elements U1 and X2 in the U-phase leg of the power conversion circuit 2. A waveform K4 is a carrier wave used in generating a control signal for controlling the switching elements U2 and X1 in the U-phase leg of the power conversion circuit 2.

In a case where the voltage is balanced between the filter capacitors 1A and 1B, as illustrated in FIG. 3, a waveform K5 of the zero-sequence voltage is symmetrical on positive and negative sides, and a phase width in an always-on period is maintained at 60°.

On the other hand, in a case where the voltage is unbalanced between the filter capacitors 1A and 1B, the symmetric shape of the waveform as illustrated in FIG. 3 collapses. Thus, in the first embodiment, a modulation signal of the two-phase modulation is controlled such that the zero-sequence voltage has a waveform K6 illustrated in FIG. 4. In the example illustrated in FIG. 4, the phase width of the zero-sequence voltage in the always-on period is controlled to $(60+\alpha)°$ on the positive side and $(60-\alpha)°$ on the negative side. FIG. 4 illustrates an example of a case where the voltage across the filter capacitor 1A placed on the high potential side is larger than the voltage across the filter capacitor 1B placed on the low potential side. In the case of the example in FIG. 4, more charges in the filter capacitor 1A placed on the high potential side are discharged than charges in the filter capacitor 1B placed on the low potential side. As a result, the voltage is controlled to be balanced between the filter capacitors 1A and 1B. When the voltage imbalance between the filter capacitors 1A and 1B is eliminated, the waveform returns to the state of FIG. 3. In the case of FIG. 3, the filter capacitors 1A and 1B are equally discharged so that a balanced voltage state is maintained.

The control method of the first embodiment described above is summarized as follows.

(1) In the case of two-phase modulation, any of the U, V, and W phases is always on for a certain period of time so that this period is used for control.

(2) On the side where the capacitor voltage is high, the always-on period of the always-on phase is increased from 60° so that the energy released from the filter capacitor having the high capacitor voltage toward the load 14 is relatively increased.

(3) Contrary to the above, on the side where the capacitor voltage is low, the always-on period of the always-on phase is decreased from 60° by an amount by which the always-on period is increased in (2) above, so that the energy released from the filter capacitor having the low capacitor voltage toward the load 14 is relatively reduced.

(4) Through the control of (2) and (3) above, the capacitor voltage is controlled to be balanced between the filter capacitors 1A and 1B.

As described in (2) and (3) above, the increase and decrease in the always-on period of the always-on phase are complementarily performed. Therefore, the voltage imbalance between the filter capacitors 1A and 1B can be eliminated without an overlap of the always-on period in the two-phase modulation. As a result, the voltage imbalance can be eliminated without an effect on the control of the two-phase modulation.

Figure 5:
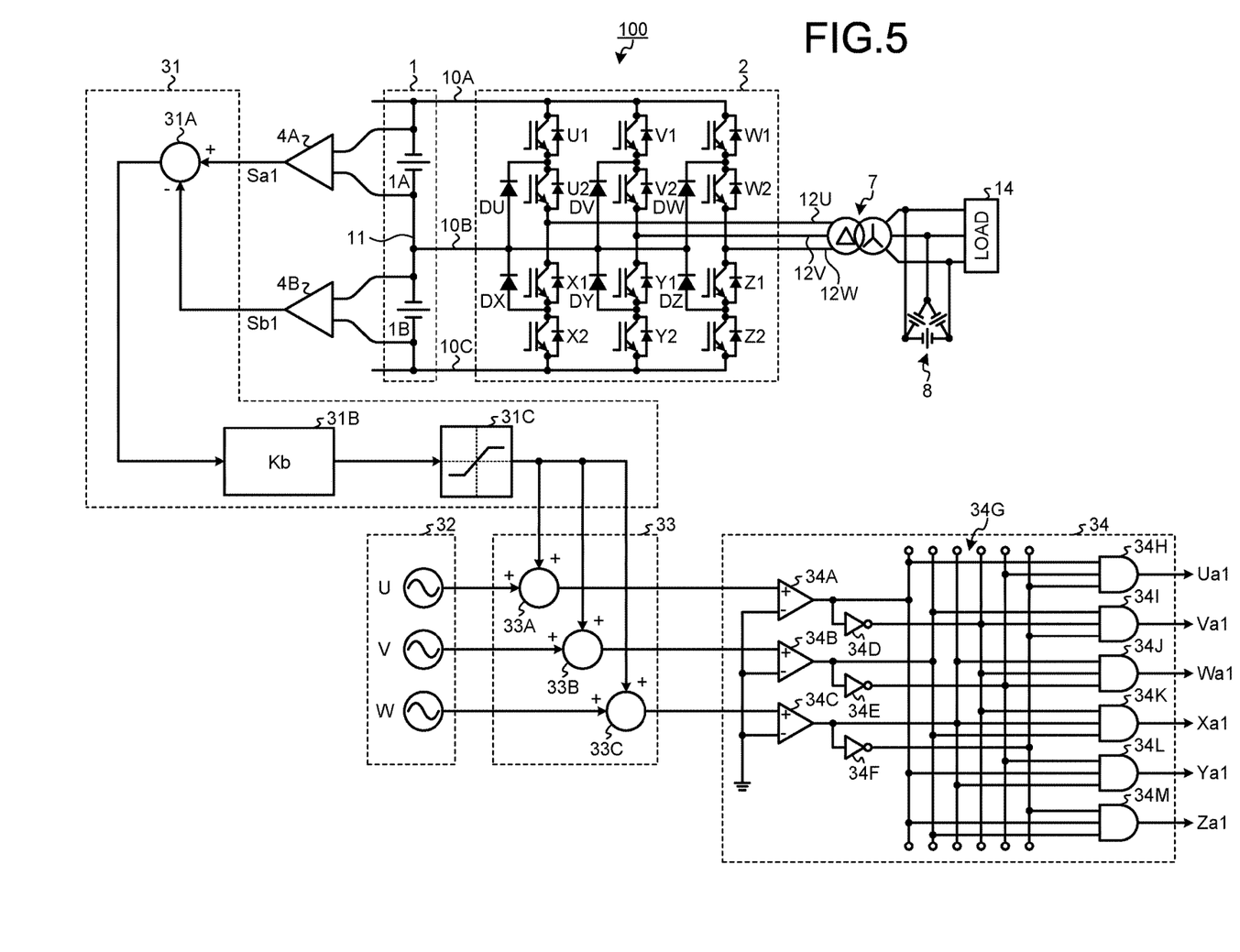
FIG. 5 is a first diagram illustrating an example of a detailed configuration of a controller of the first embodiment.
Figure 6:
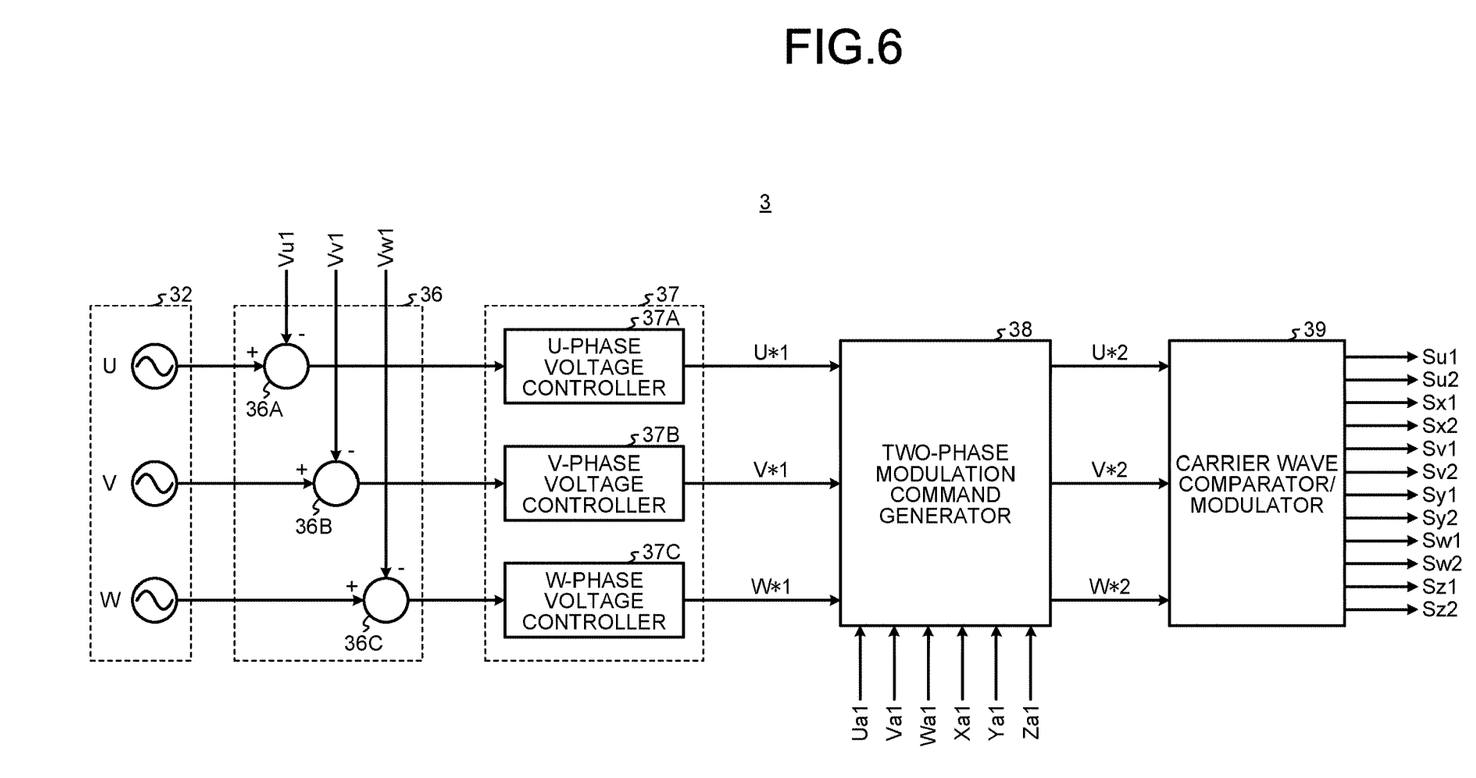
FIG. 6 is a second diagram illustrating an example of the detailed configuration of the controller of the first embodiment.

Next, a detailed configuration of the controller 3 in the first embodiment will be described with reference to FIGS. 5 and 6. FIG. 5 is a first diagram illustrating an example of the detailed configuration of the controller 3 of the first embodiment. FIG. 6 is a second diagram illustrating an example of the detailed configuration of the controller 3 of the first embodiment. Note that FIG. 5 illustrates, as an example, a configuration corresponding to the configuration of voltage detection illustrated in FIG. 1, but the present disclosure is not limited to this configuration. For example, in a case of the configuration of voltage detection illustrated in FIG. 9, the configuration of FIG. 5 can be partly modified to correspond to the configuration of FIG. 9.

As illustrated in FIG. 5, the controller 3 of the first embodiment includes an imbalance signal generator 31, a reference signal generator 32 that generates a reference signal of the three-phase alternating current voltage, a superimposition unit 33, and a stop period command generator 34. Moreover, as illustrated in FIG. 6, the controller 3 of the first embodiment includes an output voltage deviation signal generator 36, a voltage controller 37, a two-phase modulation command generator 38, and a carrier wave comparator/modulator 39. Note that, in the following description, the imbalance signal generator 31 may be referred to as a "first signal generator". In addition, a component including the stop period command generator 34, the output voltage deviation signal generator 36, the voltage controller 37, the two-phase modulation command generator 38, and the carrier wave comparator/modulator 39 may be referred to as a "second signal generator".

In FIG. 5, the imbalance signal generator 31 includes a differentiator 31A, a control gain applier 31B, and a limiter 31C. The superimposition unit 33 includes adders 33A, 33B, and 33C. The stop period command generator 34 includes comparators 34A, 34B, and 34C, signal inverters 34D, 34E, and 34F, a signal distribution circuit 34G, and logical AND operators 34H, 34I, 34J, 34K, 34L, and 34M.

Moreover, in FIG. 6, the output voltage deviation signal generator 36 includes differentiators 36A, 36B, and 36C. The voltage controller 37 includes a U-phase voltage controller 37A, a V-phase voltage controller 37B, and a W-phase voltage controller 37C.

Next, the operation of the controller 3 will be described. The differentiator 31A receives the first capacitor voltage Sa1 detected by the voltage sensor 4A and the second capacitor voltage Sb1 detected by the voltage sensor 4B. The differentiator 31A calculates a voltage deviation, which is a deviation between the first capacitor voltage Sa1 and the second capacitor voltage Sb1, and outputs the voltage deviation to the control gain applier 31B. Note that the voltage deviation in this case is the deviation between the capacitor voltages and is called a "first voltage deviation" where appropriate in order to be distinguished from a deviation between a voltage reference signal and the output voltage of each phase to be described later.

The control gain applier 31B applies a control gain Kb to the first voltage deviation. The first voltage deviation to which the control gain Kb has been applied is input to the limiter 31C. The first voltage deviation input to the limiter 31C is a signal having a positive or negative value. The limiter 31C generates and outputs a signal obtained by limiting an absolute value of the first voltage deviation that has been input. The limiter 31C limits the absolute value of the first voltage deviation as required by the two-phase modulation. By limiting the absolute value of the first voltage deviation, the control according to the first embodiment can be reliably performed without affecting the operating range of the two-phase modulation.

The signal generated by the limiter 31C is input to each of the adders 33A, 33B, and 33C as an imbalance signal representing an imbalance between the first capacitor voltage Sa1 and the second capacitor voltage Sb1. This imbalance signal corresponds to the zero-sequence voltage illustrated in FIG. 4. In the first embodiment, the zero-sequence voltage is not directly generated but is equivalently generated. In this sense, the imbalance signal generated by the limiter 31C can be referred to as a "zero-sequence voltage command".

Returning to FIG. 5, the adder 33A adds the imbalance signal to a U-phase reference signal output from the reference signal generator 32 and outputs the added signal to the comparator 34A. The adder 33B adds the imbalance signal to a V-phase reference signal output from the reference signal generator 32 and outputs the added signal to the comparator 34B. The adder 33C adds the imbalance signal to a W-phase reference signal output from the reference signal generator 32 and outputs the added signal to the comparator 34C.

In the stop period command generator 34, the comparators 34A, 34B, and 34C and the signal inverters 34D, 34E, and 34F identify periods in which the signal output from the superimposition unit 33 is positive and negative, and the identified signal is input to the signal distribution circuit 34G. The logical AND operators 34H, 34I, 34J, 34K, 34L, and 34M receive the output from the signal distribution circuit 34G and generate a stop period command that is a command signal representing a period for stopping switching control in each phase. In FIG. 5, a stop period command Ua1 is the stop period command for stopping the switching operation of the switching elements U1 and U2 of the U-phase positive arm. Similarly, a stop period command Va1 is the stop period command for stopping the switching operation of the switching elements V1 and V2 of the V-phase positive arm. A stop period command Wa1 is the stop period command for stopping the switching operation of the switching elements W1 and W2 of the W-phase positive arm. A stop period command Xa1 is the stop period command for stopping the switching operation of the switching elements X1 and X2 of the U-phase negative arm. A stop period command Ya1 is the stop period command for stopping the switching operation of the switching elements Y1 and Y2 of the V-phase negative arm. A stop period command Za1 is the stop period command for stopping the switching operation of the switching elements Z1 and Z2 of the W-phase negative arm.

Moreover, in FIG. 6, the differentiator 36A calculates a U-phase voltage deviation, which is a deviation between the U-phase reference signal output from the reference signal generator 32 and the U-phase output voltage Vu1 detected by the voltage detector 5U, and outputs the U-phase voltage deviation to the U-phase voltage controller 37A. The differentiator 36B calculates a V-phase voltage deviation, which is a deviation between the V-phase reference signal output from the reference signal generator 32 and the V-phase output voltage Vv1 detected by the voltage detector 5V, and outputs the V-phase voltage deviation to the V-phase voltage controller 37B. The differentiator 36C calculates a W-phase voltage deviation, which is a deviation between the W-phase reference signal output from the reference signal generator 32 and the W-phase output voltage Vw1 detected by the voltage detector 5W, and outputs the W-phase voltage deviation to the W-phase voltage controller 37C.

The U-phase voltage controller 37A generates a first U-phase voltage command U*1 on the basis of the U-phase voltage deviation. The V-phase voltage controller 37B generates a first V-phase voltage command V*1 on the basis of the V-phase voltage deviation. The W-phase voltage controller 37C generates a first W-phase voltage command W*1 on the basis of the W-phase voltage deviation. The first U-phase voltage command U*1, the first V-phase voltage command V*1, and the first W-phase voltage command W*1 are input to the two-phase modulation command generator 38. The two-phase modulation command generator 38 also receives the stop period commands Ua1, Va1, Wa1, Xa1, Ya1, and Za1 generated by the stop period command generator 34.

The two-phase modulation command generator 38 corrects the first U-phase voltage command U*1, the first V-phase voltage command V*1, and the first W-phase voltage command W*1 on the basis of the stop period commands Ua1, Va1, Wa1, Xa1, Ya1, and Za1, and outputs the corrected U-phase, V-phase, and W-phase voltage commands as two-phase modulation commands to the carrier wave comparator/modulator 39. A two-phase modulation command U*2 is a modulation command for causing the switching element of the U-phase leg to perform a two-phase modulation operation. A two-phase modulation command V*2 is a modulation command for causing the switching element of the V-phase leg to perform a two-phase modulation operation. A two-phase modulation command W*2 is a modulation command for causing the switching element of the W-phase leg to perform a two-phase modulation operation.

The carrier wave comparator/modulator 39 compares each of the two-phase modulation commands U*2, V*2, and W*2 with a carrier wave to generate 12 modulation signals Su1, Su2, Sx1, Sx2, Sv1, Sv2, Sy1, Sy2, Sw1, Sw2, Sz1, and Sz2 for causing the switching elements of the power conversion circuit 2 to perform the two-phase modulation operation. The modulation signal Su1 is a control signal for causing the switching element U1 to perform the two-phase modulation operation. The modulation signal Su2 is a control signal for causing the switching element U2 to perform the two-phase modulation operation. The modulation signal Sx1 is a control signal for causing the switching element X1 to perform the two-phase modulation operation. The modulation signal Sx2 is a control signal for causing the switching element X2 to perform the two-phase modulation operation. The same applies to the switching elements of the phases other than the U-phase, and thus the description thereof is omitted here.

The functions of the controller 3 described above can be implemented by a field-programmable gate array (FPGA), an application specific integrated circuit (ASIC), or a processing circuitry obtained by a combination thereof.

Implementing the functions of the controller 3 described above by the processing circuitry can eliminate the voltage imbalance between the first and second capacitors.

Figure 7:
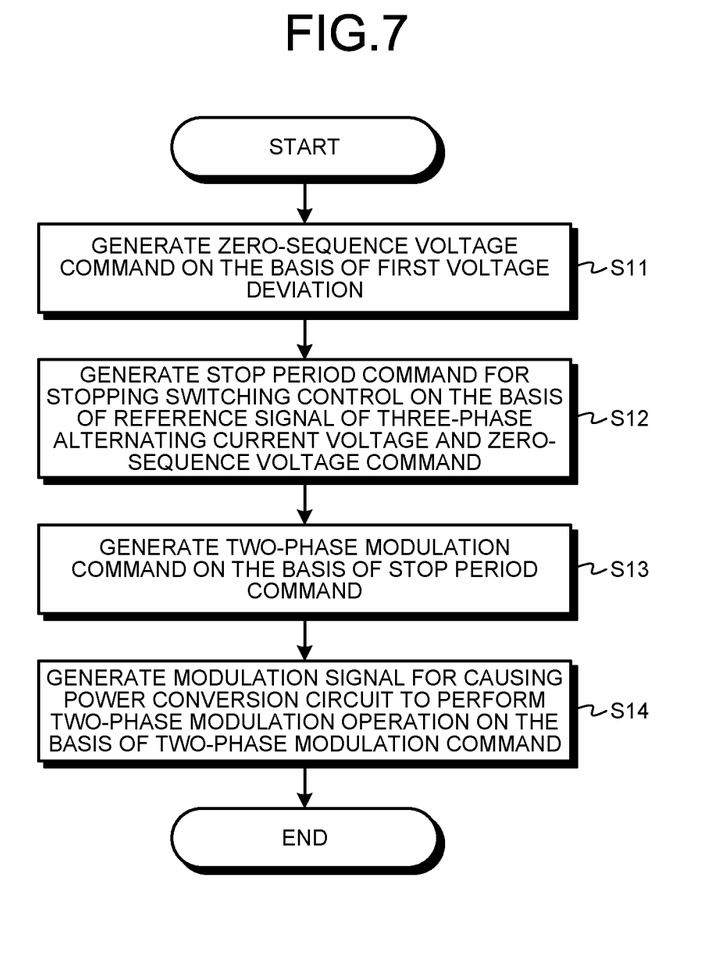
FIG. 7 is a flowchart illustrating a flow of processing of the controller of the first embodiment.

The functions of the controller 3 described above can also be implemented by software. FIG. 7 is a flowchart illustrating a flow of processing of the controller 3 of the first embodiment.

The controller 3 generates the zero-sequence voltage command on the basis of the first voltage deviation (step S11). As described above, the first voltage deviation is the deviation between the first capacitor voltage Sa1 and the second capacitor voltage Sb1. The controller 3 generates the stop period command for stopping the switching control on the basis of the reference signal of the three-phase alternating current voltage and the zero-sequence voltage command generated in step S11 (step S12). The controller 3 generates the two-phase modulation command on the basis of the stop period command generated in step S12 (step S13). On the basis of the two-phase modulation command generated in step S13, the controller 3 generates the modulation signal for causing the power conversion circuit 2 to perform the two-phase modulation operation (step S14).

The voltage imbalance between the first and second capacitors can also be eliminated by performing the processing from step S11 to step S14 above.

Figure 8:
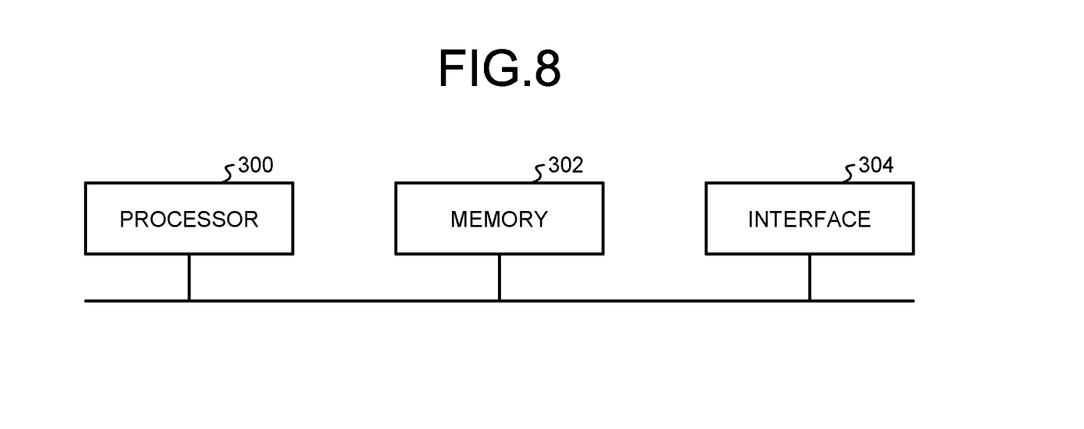
FIG. 8 is a block diagram illustrating an example of a hardware configuration in a case where some functions of the controller of the first embodiment are implemented by software.

FIG. 8 is a block diagram illustrating an example of a hardware configuration in a case where some functions of the controller 3 of the first embodiment are implemented by software.

When some functions of the controller 3 of the first embodiment are implemented by software, as illustrated in FIG. 8, the hardware configuration can include a processor 300 that performs an arithmetic operation, a memory 302 that saves programs to be read by the processor 300, and an interface 304 that inputs and outputs signals.

The processor 300 may be arithmetic means such as an arithmetic unit, a microprocessor, a microcomputer, a central processing unit (CPU), or a digital signal processor (DSP). The memory 302 can include, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disc, or a digital versatile disc (DVD).

The memory 302 stores the programs for executing the functions of the controller 3 of the first embodiment. The processor 300 transmits and receives necessary information via the interface 304, executes the programs stored in the memory 302, and refers to a table stored in the memory 302, thereby being able to perform the processing described above. A result of arithmetic operation by the processor 300 can be stored in the memory 302.

As described above, according to the three-level power converter of the first embodiment, the controller generates the imbalance signal indicating the imbalance between the first capacitor voltage as the first physical quantity and the second capacitor voltage as the second physical quantity on the basis of the first capacitor voltage and the second capacitor voltage. The controller generates the modulation signal that causes the power conversion circuit to perform the two-phase modulation operation on the basis of a superimposed signal obtained by superimposing the imbalance signal on the reference signal of the three-phase alternating current voltage. As a result, the voltage imbalance between the first and second capacitors can be eliminated even when the three-level power converter adopts the two-phase modulation method.

Moreover, the method of controlling the intermediate potential of the direct current power supply unit according to the first embodiment executes the following first, second, third, and fourth steps. In the first step, the zero-sequence voltage command is generated on the basis of the first voltage deviation that is the deviation between the first capacitor voltage as the voltage across the first capacitor and the second capacitor voltage as the voltage across the second capacitor. In the second step, the stop period command for stopping the switching control of the switching element is generated on the basis of the reference signal of the three-phase alternating current voltage and the zero-sequence voltage command generated in the first step. In the third step, the two-phase modulation command is generated on the basis of the stop period command generated in the second step. In the fourth step, the modulation signal for causing the power conversion circuit to perform the two-phase modulation operation is generated on the basis of the two-phase modulation command generated in the third step. Through these first, second, third, and fourth steps, the voltage imbalance between the first and second capacitors can be eliminated when the three-level power converter adopts the two-phase modulation method.

Note that the first embodiment has illustrated the case where the power conversion circuit is the three-level inverter that converts the three-level direct current voltage output from the high potential line, the intermediate potential line, and the low potential line into the three-phase alternating current voltage, but the present disclosure is not limited to this example. The power conversion circuit may be a three-level converter that converts a single-phase alternating current voltage or a three-phase alternating current voltage into a three-level direct current voltage and outputs the three-level direct current voltage to the high potential line, the intermediate potential line, and the low potential line. As with the three-level inverter, the three-level converter also has a configuration in which the first capacitor is connected between the high potential line and the intermediate potential line and the second capacitor is connected between the intermediate potential line and the low potential line, and thus a similar problem occurs in the three-level converter as well. Therefore, the problem can be solved by applying the method of the first embodiment to the three-level converter.

Second Embodiment

Figure 10:
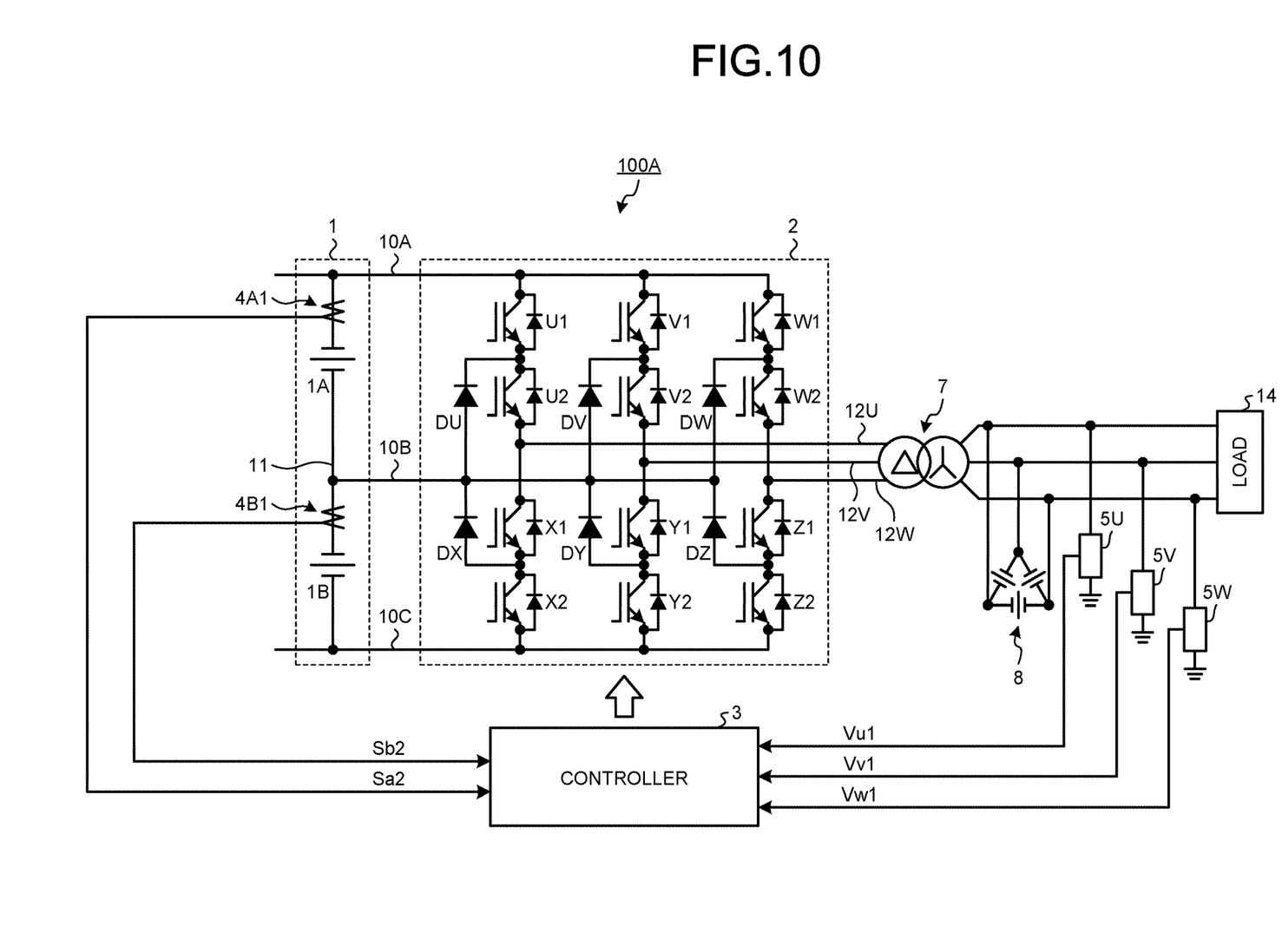
FIG. 10 is a diagram illustrating an example of a configuration of a three-level power converter according to a second embodiment.

FIG. 10 is a diagram illustrating an example of a configuration of a three-level power converter 100A according to a second embodiment. In the three-level power converter 100A according to the second embodiment, current sensors 4A1 and 4B1 replace the voltage sensors 4A and 4B in the configuration of the three-level power converter 100 illustrated in FIG. 1, respectively. The rest of the configuration is identical or equivalent to that of FIG. 1 so that components identical or equivalent to those of FIG. 1 are denoted by the same reference numerals as those in FIG. 1, and a redundant description will be omitted.

In FIG. 10, the current sensor 4A1 monitors a charge/discharge current flowing through the filter capacitor 1A. The current sensor 4B1 monitors a charge/discharge current flowing through the filter capacitor 1B. Charge/discharge currents Sa2 and Sb2 monitored by corresponding ones of the current sensors 4A1 and 4B1 are input to the controller 3. The controller 3 generates an imbalance signal on the basis of the charge/discharge currents Sa2 and Sb2. The subsequent operations are as described above.

Note that the charge/discharge current Sa2 flowing through the filter capacitor 1A is a physical quantity representing a state of the filter capacitor 1A. Therefore, in the following description, the charge/discharge current Sa2 flowing through the filter capacitor 1A may be referred to as a "first physical quantity". Likewise, the charge/discharge current Sb2 flowing through the filter capacitor 1B is a physical quantity representing a state of the filter capacitor 1B. Therefore, in the following description, the charge/discharge current Sb2 flowing through the filter capacitor 1B may be referred to as a "second physical quantity".

As described above, according to the three-level power converter of the second embodiment, the controller generates the imbalance signal, which represents an imbalance between the charge/discharge current flowing through the first capacitor as the first physical quantity and the charge/discharge current flowing through the second capacitor as the second physical quantity, on the basis of these charge/discharge currents. The controller generates a modulation signal that causes the power conversion circuit to perform the two-phase modulation operation on the basis of a superimposed signal obtained by superimposing the imbalance signal on a reference signal of a three-phase alternating current voltage. As a result, the voltage imbalance between the first and second capacitors can be eliminated even when the three-level power converter adopts the two-phase modulation method.

Note that the configurations illustrated in the above embodiments merely illustrate an example so that another known technique can be combined, the embodiments can be combined together, or the configurations can be partially omitted and/or modified without departing from the scope of the present disclosure.

REFERENCE SIGNS LIST 1 direct current power supply unit; 1A, 1B filter capacitor; 2 power conversion circuit; 3 controller; 4A, 4B voltage sensor; 4A1, 4B1 current sensor; 5U, 5V, 5W voltage detector; 7 transformer; 8 three-phase capacitor circuit; 10A high potential line; 10B intermediate potential line; 10C low potential line; 11 connection point; 12U U-phase alternating current wire; 12V V-phase alternating current wire; 12W W-phase alternating current wire; 14 load; 31 imbalance signal generator; 31A differentiator; 31B control gain applier; 31C limiter; 32 reference signal generator; 33 superimposition unit; 33A, 33B, 33C adder; 34 stop period command generator; 34A, 34B, 34C comparator; 34D, 34E, 34F signal inverter; 34G signal distribution circuit; 34H, 34I, 34J, 34K, 34L, 34M logical AND operator; 36 output voltage deviation signal generator; 36A, 36B, 36C differentiator; 37 voltage controller; 37A U-phase voltage controller; 37B V-phase voltage controller; 37C W-phase voltage controller; 38 two-phase modulation command generator; 39 carrier wave comparator/modulator; 100, 100A three-level power converter; 300 processor; 302 memory; 304 interface; DU, DV, DW, DX, DY, DZ diode; U1, U2, V1, V2, W1, W2, X1, X2, Y1, Y2, Z1, Z2 switching element.

The invention claimed is:

1. A three-level power converter comprising:
a direct current power supply circuitry including a first capacitor connected between a high potential line and an intermediate potential line and a second capacitor connected between the intermediate potential line and a low potential line;
a power conversion circuit to convert a three-level direct current voltage output from the high potential line, the intermediate potential line, and the low potential line into a three-phase alternating current voltage, or convert a three-phase alternating current voltage into a three-level direct current voltage and output the three-level direct current voltage to the high potential line, the intermediate potential line, and the low potential line;
a controller to control an operation of the power conversion circuit; and
a first sensor and a second sensor to detect a first quantity that is a quantity of the first capacitor and a second quantity that is a quantity of the second capacitor, wherein
the controller includes:
a first signal generator to generate an imbalance signal representing an imbalance between the first quantity and the second quantity on the basis of values detected by the first sensor and the second sensor;
a superimposition circuitry to superimpose the imbalance signal on a reference signal of the three-phase alternating current voltage; and
a second signal generator to generate a modulation signal that causes the power conversion circuit to perform a two-phase modulation operation on the basis of a superimposed signal output from the superimposition circuitry.

2. The three-level power converter according to claim 1, wherein
the first quantity is a voltage across the first capacitor, and the second quantity is a voltage across the second capacitor.

3. The three-level power converter according to claim 2, wherein
the power conversion circuit includes a plurality of switching elements,
the second signal generator includes:
a stop period command generator to generate a stop period command for stopping a switching operation of the switching elements on the basis of the superimposed signal; and
a two-phase modulation command generator to generate, on the basis of the stop period command, a two-phase modulation command that is a modulation command for causing the switching elements to perform a two-phase modulation operation,
the first signal generator outputs the imbalance signal as a zero-sequence voltage command, and
the stop period command generator uses the zero-sequence voltage command to generate the stop period command.

4. The three-level power converter according to claim 3, wherein
the power conversion circuit is a three-level inverter that converts the three-level direct current voltage into the three-phase alternating current voltage.

5. The three-level power converter according to claim 3, wherein
the power conversion circuit is a three-level converter that converts the three-phase alternating current voltage into the three-level direct current voltage.

6. The three-level power converter according to claim 2, wherein
the power conversion circuit is a three-level inverter that converts the three-level direct current voltage into the three-phase alternating current voltage.

7. The three-level power converter according to claim 2, wherein
the power conversion circuit is a three-level converter that converts the three-phase alternating current voltage into the three-level direct current voltage.

8. The three-level power converter according to claim 1, wherein
the first quantity is a charge/discharge current flowing through the first capacitor, and the second quantity is a charge/discharge current flowing through the second capacitor.

9. The three-level power converter according to claim 8, wherein
the power conversion circuit includes a plurality of switching elements.

10. The three-level power converter according to claim 9, wherein
the power conversion circuit is a three-level inverter that converts the three-level direct current voltage into the three-phase alternating current voltage.

11. The three-level power converter according to claim 9, wherein
the power conversion circuit is a three-level converter that converts the three-phase alternating current voltage into the three-level direct current voltage.

12. The three-level power converter according to claim 8, wherein
the power conversion circuit is a three-level inverter that converts the three-level direct current voltage into the three-phase alternating current voltage.

13. The three-level power converter according to claim 8, wherein
the power conversion circuit is a three-level converter that converts the three-phase alternating current voltage into the three-level direct current voltage.

14. The three-level power converter according to claim 1, wherein
the power conversion circuit includes a plurality of switching elements,
the second signal generator includes:
a stop period command generator to generate a stop period command for stopping a switching operation of the switching elements on the basis of the superimposed signal; and
a two-phase modulation command generator to generate, on the basis of the stop period command, a two-phase modulation command that is a modulation command for causing the switching elements to perform a two-phase modulation operation,
the first signal generator outputs the imbalance signal as a zero-sequence voltage command, and
the stop period command generator uses the zero-sequence voltage command to generate the stop period command.

15. The three-level power converter according to claim 14, wherein
the power conversion circuit is a three-level inverter that converts the three-level direct current voltage into the three-phase alternating current voltage.

16. The three-level power converter according to claim 14, wherein
the power conversion circuit is a three-level converter that converts the three-phase alternating current voltage into the three-level direct current voltage.

17. The three-level power converter according to claim 1, wherein
the power conversion circuit is a three-level inverter that converts the three-level direct current voltage into the three-phase alternating current voltage.

18. The three-level power converter according to claim 1, wherein
the power conversion circuit is a three-level converter that converts the three-phase alternating current voltage into the three-level direct current voltage.

19. A method of controlling an intermediate potential of a direct current power supply circuitry that includes a first capacitor connected between a high potential line and an intermediate potential line and a second capacitor connected between the intermediate potential line and a low potential line, and applies a three-level direct current voltage to a power conversion circuit including a switching element, the method comprising:
generating a zero-sequence voltage command on the basis of a first voltage deviation that is a deviation between a first capacitor voltage as a voltage across the first capacitor and a second capacitor voltage as a voltage across the second capacitor;
generating a stop period command that stops switching control of the switching element on the basis of a reference signal of a three-phase alternating current voltage and the zero-sequence voltage command generated;
generating a two-phase modulation command on the basis of the stop period command generated; and
generating a modulation signal that causes the power conversion circuit to perform a two-phase modulation operation on the basis of the two-phase modulation command generated.

* * * * *